Sept. 8, 1959       L. S. SUOZZO       2,903,213
CONSTANT SUPPORT DEVICE
Filed Dec. 23, 1955       6 Sheets-Sheet 1

INVENTOR
LEONARD S. SUOZZO

ATTORNEY

Sept. 8, 1959                L. S. SUOZZO                2,903,213
                          CONSTANT SUPPORT DEVICE
Filed Dec. 23, 1955                                    6 Sheets-Sheet 3

INVENTOR
LEONARD S. SUOZZO

ATTORNEY

Sept. 8, 1959 L. S. SUOZZO 2,903,213
CONSTANT SUPPORT DEVICE
Filed Dec. 23, 1955 6 Sheets-Sheet 4

INVENTOR
LEONARD S. SUOZZO
F. J. Pisarra
ATTORNEY

Sept. 8, 1959        L. S. SUOZZO        2,903,213

CONSTANT SUPPORT DEVICE

Filed Dec. 23, 1955        6 Sheets-Sheet 5

INVENTOR
LEONARD S. SUOZZO

ATTORNEY

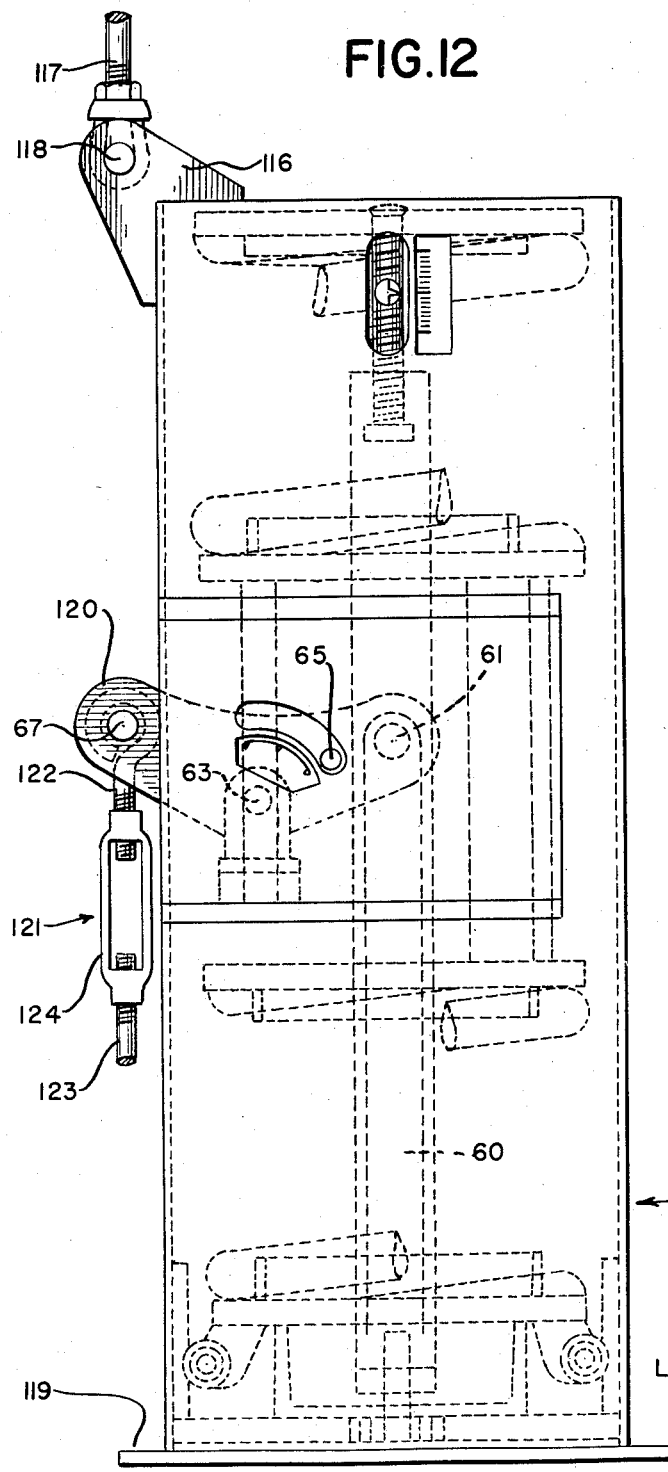

United States Patent Office 2,903,213
Patented Sept. 8, 1959

2,903,213

CONSTANT SUPPORT DEVICE

Leonard S. Suozzo, Hackensack, N.J., assignor to Bergen Pipesupport Corp., New York, N.Y., a corporation of New York Application December 23, 1955, Serial No. 555,010

12 Claims. (Cl. 248—54)

This invention relates to a support for various types of loads, including pipes or the like. The invention pertains, in one of its more specific aspects, to a spring-loaded constant support device that is adapted to permit vertical movement of a load and simultaneously subject the load to a substantially constant supporting force.

The present invention may be advantageously used in various locations. It is especially useful in power plants and other places for supporting pipe arrangements while permitting movement of the pipes as a result of expansion or contraction thereof, due to temperature changes in the material of the pipes.

One of the outstanding features of the invention resides in constructing and arranging the parts of the device in a manner to obtain a compact structure. As a consequence, the device, when used to suspend a load, requires less headroom than similar devices which are presently available. Headroom, e.g., vertical space, is oftentimes so restricted in steam power plants and other locales, that it is extremely difficult, and at times impossible, to adequately support piping at a reasonable cost by means of conventional spring supports. This is occasioned by the fact that the dimensions of conventional spring supports are such as to require substantial headroom to permit proper installation and operation. My device overcomes many of the difficulties experienced heretofore. Its design and physical dimensions permit ready installation and entirely satisfactory operation in locations where headroom is at a premium.

My construction includes a spring mechanism that is stationary relative to its supporting frame and other elements in contradistinction to conventional spring hangers wherein the spring mechanism is pivoted relative to its supporting frame. This contributes materially to reduction in the height of the device during use. Moreover, various parts are so constructed and arranged as to further reduce the height of the device and correspondingly reduce other dimensions thereof, as will be apparent from the accompanying drawings and the detailed description appearing further along herein.

This invention has for a principal object the provision of a constant support device having improved features of design and construction.

Another object of the invention is to provide a spring hanger that is adapted to be readily installed and used in locations where vertical space is restricted.

Another object of the invention is to provide a device of the character indicated including means to permit of ready adjustment prior or subsequent to installation, means for indicating the extent of load travel and viewable from a point remote from the device and means for limiting load travel in at least one direction.

A further object of the invention is to provide a spring-loaded constant support device that is compact in design and sturdy in construction; that has its moving parts substantially wholly within and protected by a frame; that is reasonable in manufacturing cost; and that is adapted to be readily assembled, adjusted and mounted in position for active use.

The invention has for a still further object the provision of a constant support device for pipes or the like that is capable of performing its intended functions in an entirely satisfactory and efficient manner.

The enumerated objects and additional objects, together with the advantages obtainable by the use of the apparatus of this invention, will be readily understood by persons skilled in the art upon reference to the following detailed description taken in conjunction with the annexed drawings, which respectively describe and illustrate several forms of apparatus embodying the invention.

Figure 1:
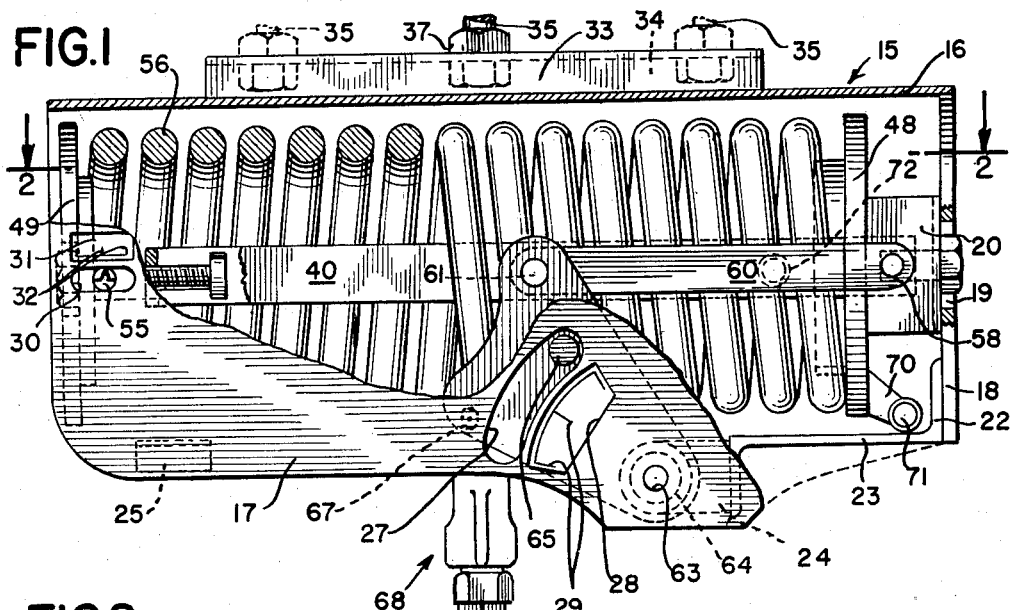
Fig. 1 is a view in side elevation of a spring support device constructed in accordance with the invention, certain parts being broken away for better illustration of other parts.
Figure 4:
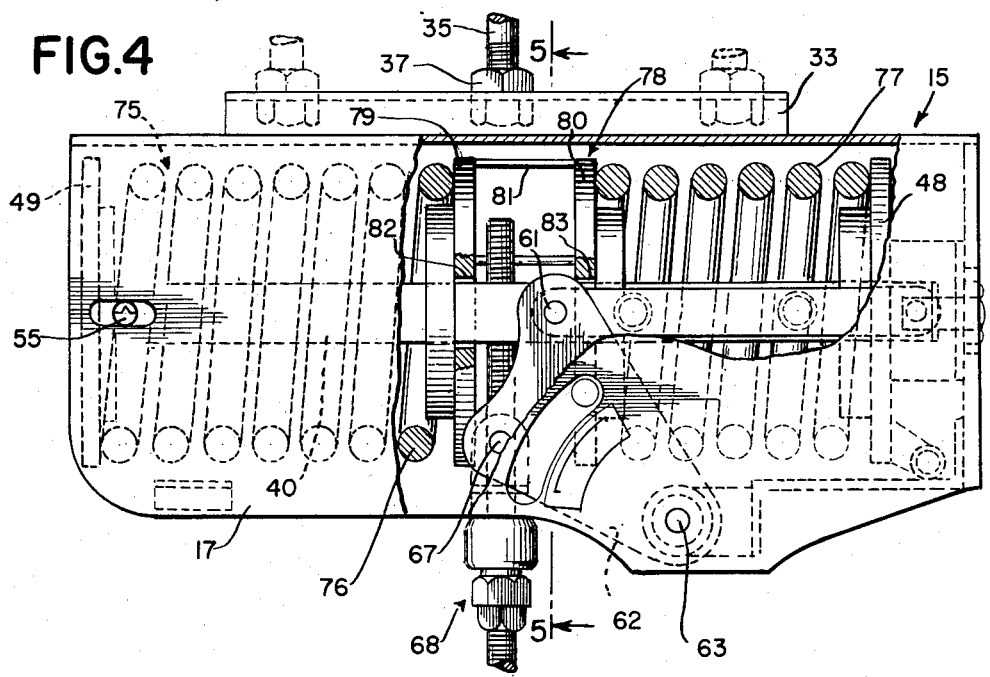
Figure 5:
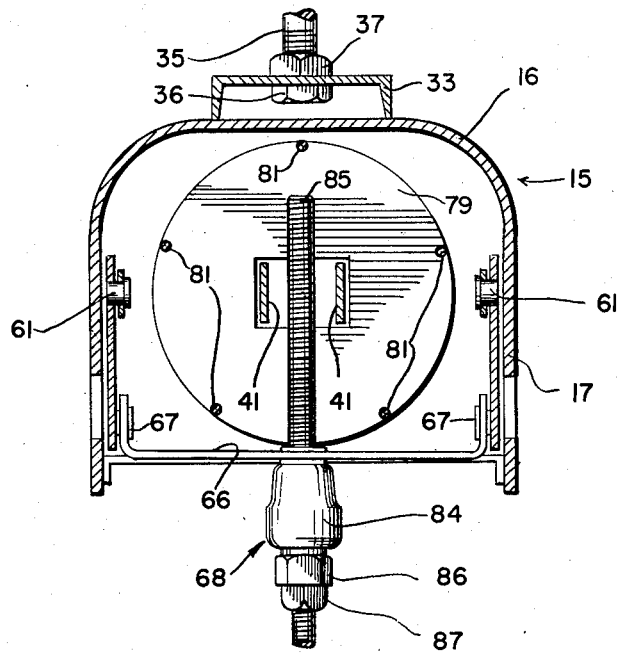
Figure 6:
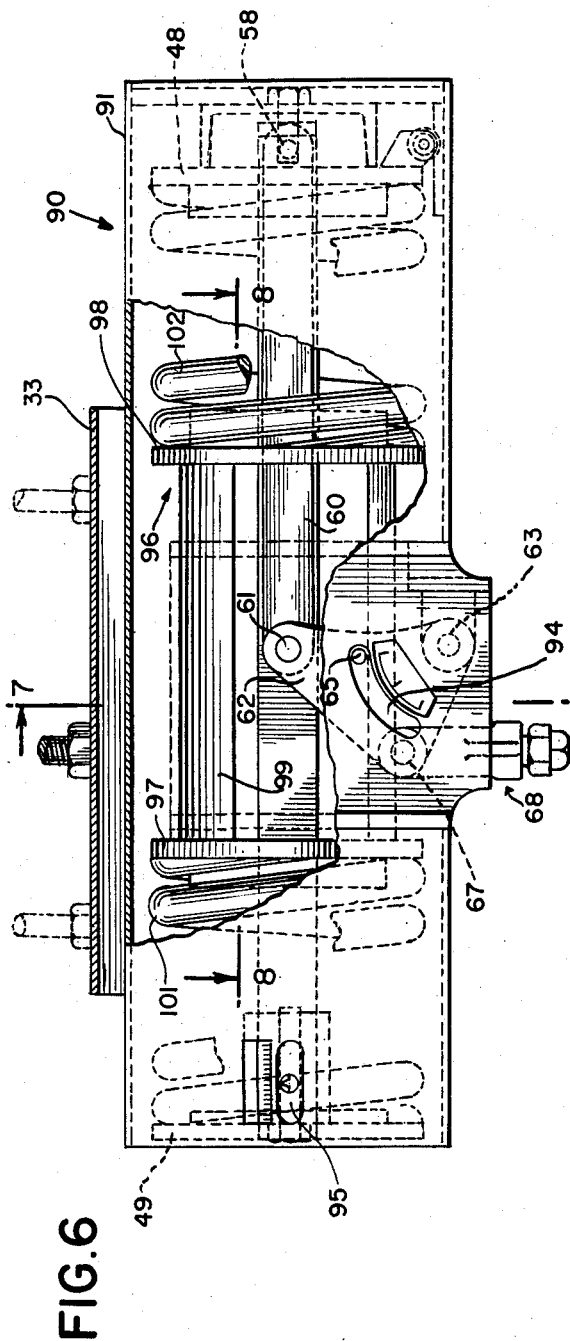
Figure 8:
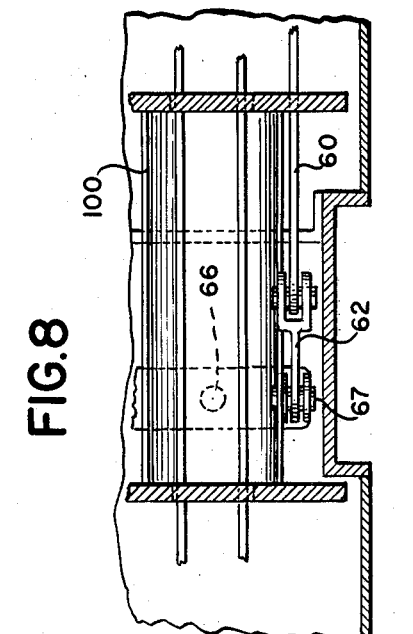
Figure 7:
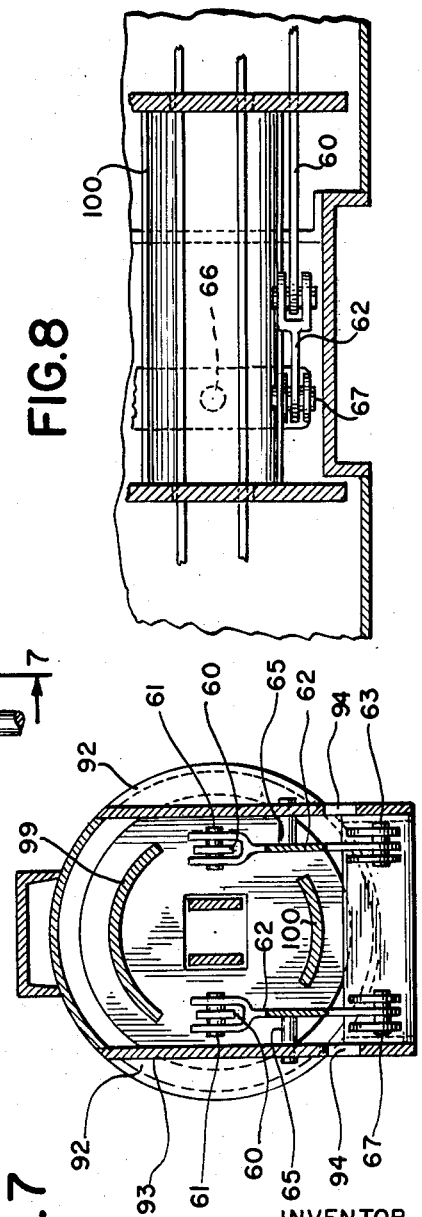
Figure 9:
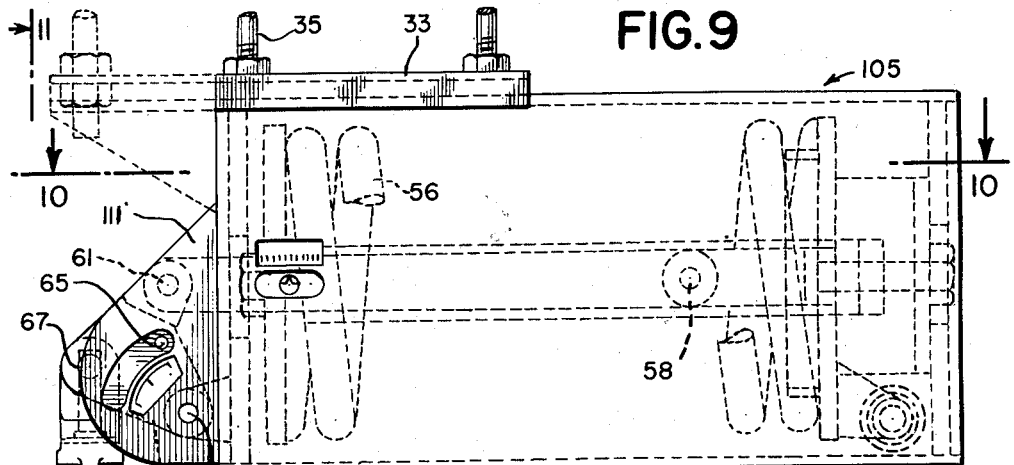
Figure 10:
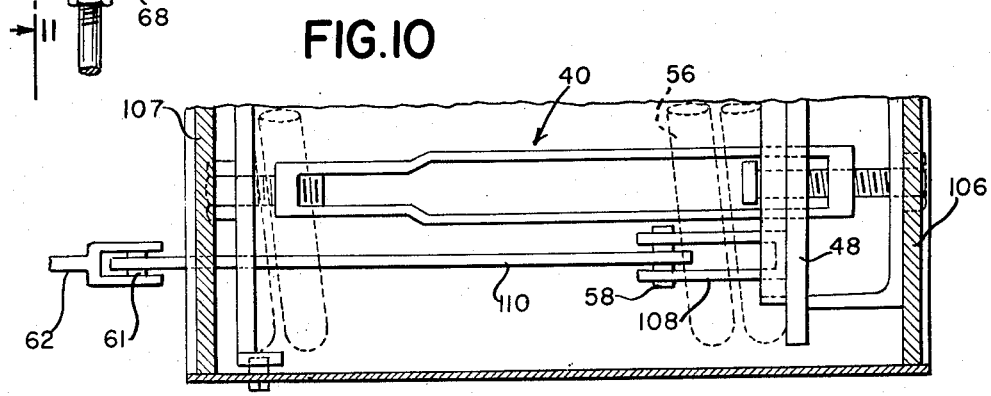
Figure 11:
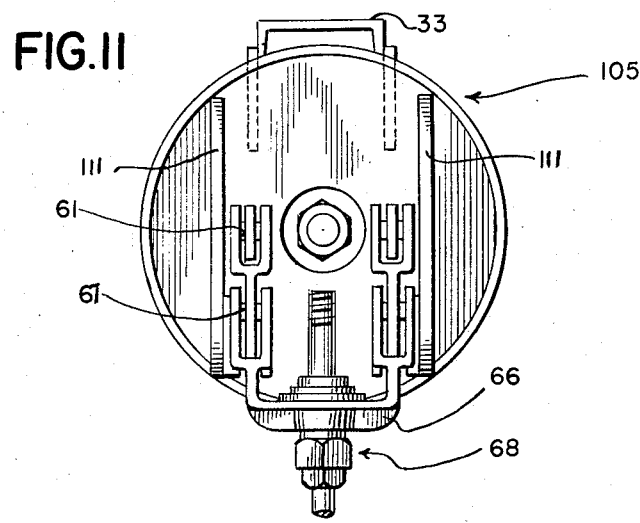

Fig. 4 corresponds to Fig. 1 and illustrates a first modification of the invention;

Fig. 5 is a view taken along line 5—5 of Fig. 4;

Fig. 6 also corresponds to Fig. 1 and is illustrative of a second modification of the invention;

Fig. 7 is a view taken along line 7—7 of Fig. 6;

Fig. 8 is a fragmentary view taken along line 8—8 of Fig. 6;

Fig. 9 is a view in side elevation of a third modification of the invention;

Fig. 10 is a view taken along line 10—10 of Fig. 9;

Fig. 11 is a view taken along line 11—11 of Fig. 9; and

Fig. 12 is a view in elevation and illustrates a fourth modification of the invention.

Referring now to the drawings, wherein like reference numerals denote corresponding parts throughout the several views, a housing, indicated by numeral 15, includes an inverted generally U-shaped frame consisting of a web 16 and a pair of parallel spaced-apart sides 17 that serve as the side walls of the housing. The housing also includes an end plate 18 having a central aperture 19. A channel member 20 is affixed to plate 18 and is formed with an opening 21 (Fig. 2) which is in alignment with aperture 19. The housing also includes a generally Z-shaped member 22 that is affixed to frame side walls 17 and end plate 18. Member 22 includes a generally horizontal central portion 23. Attached to one end of member 22 is a pair of spaced parallel plates 24. A stretcher 25 extends across the interior of the frame and is secured to side walls 17. A pair of relatively small plates 26 are secured to the ends of the side walls remote from end plate 18. The foregoing elements, namely the frame, end plate 18, channel member 20, Z-shaped member 22, stretcher 25 and plates 26 are arranged as shown and are joined together, preferably by welding, to obtain a rigid unitary housing structure.

The housing is provided with a pair of aligned arcuate slots 27 formed in side walls 17. An indicator plate 28 is positioned adjacent each slot 27 and is graduated, as indicated at 29, for purposes that will be explained further along herein. The housing is also provided with a pair of aligned horizontal slots 30 which extend through each side wall 17 and corresponding plate 26. Adjacent each slot 30 is an indicator plate 31 that is graduated as indicated at 32.

A channel member 33 is welded to frame web 16 and includes a web 34 that is spaced above the frame web. Channel member 33 carries a series of connectors 35. As shown in Fig. 5, each connector is threaded at its lower end and engages a corresponding nut 36 which is welded to the underside of channel web 34. Each connector is equipped with a locking nut 37.

Positioned within the housing is a spring mechanism that includes a support unit 40. The support unit comprises a pair of bars 41 that are maintained in the illustrated spaced relation by spreaders 42 and 43 and end plates 45 and 46 which are provided with axially aligned taps (not shown). End plate 45 is engaged by a bolt 47 that extends through opening 21 in channel member 20. The support unit carries a pair of spring backing plates 48 and 49. Plate 48 has a central opening 50 of a size and configuration to permit movement of that plate along support unit 40 but prevent rotation of the plate relative to the support unit. A bolt 51 extends through plate 49 and the tapped opening in plate 46. Bolt 51 carries a retaining nut 52. A pair of spaced guide fingers 53 are attached to backing plate 49 and are disposed to opposite sides of the support unit. It will be observed that bolt 51 permits of axial adjustment of backing plate 49 relative to the support unit. Guide fingers 53 prevent relative rotation between the backing plate and the support unit. A pair of arms 54 are attached to backing plate 49 and carry axially aligned pins 55 each of which registers with a corresponding slot 30. Each pin 55 coacts with its slot to permit horizontal movement and adjustment of plate 49 along support unit 40. Each pin 55 also coacts with the graduations 32 to indicate the loading on a helical compression spring 56 which is positioned between and bears against the backing plates. The loading on the spring may be readily adjusted by turning either or both bolts 47 and 51, as required. It will be observed from Fig. 2 that spring 56 normally and yieldingly urges backing plate 48 toward the right to the extent permitted by channel member 20.

Figure 2:
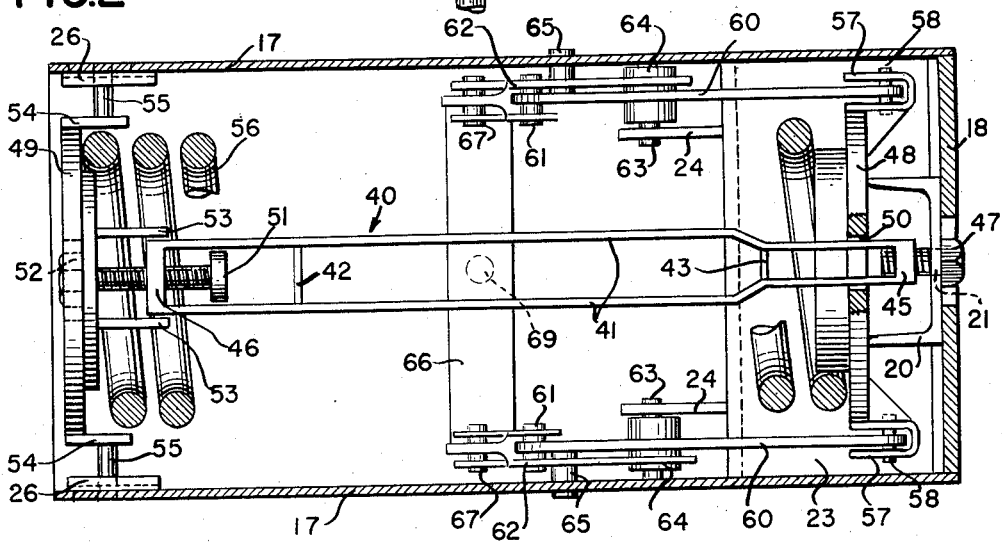
Fig. 2 is a view taken along line 2—2 of Fig. 1.

Referring again to backing plate 48, the same carries a pair of U-brackets 57 that support corresponding shafts 58. These shafts are coaxial and parallel to pins 55. Each of a pair of arms 60 is connected to and pivotal about the axis of a corresponding shaft 58. Arms 60 are also connected to and pivotal about the axes of shafts 61 which are carried by corresponding levers 62. Shafts 61 are coaxial and parallel to shafts 58. Levers 62 are pivotally connected to coaxial shafts 63 which are journaled at their ends in corresponding frame side walls 17 and plates 24 (Fig. 2). The shafts 63 are equipped with bearings 64 for the levers. Each lever 62 carries a lateral pin 65 that registers with a corresponding arcuate slot 27. Pins 65 are coaxial and limit pivotal movement of levers 62 about shafts 63 as allowed by the extremities of the arcuate slots. Pins 65 coact with the graduations 29 on plates 28 to indicate the extent of travel of loads carried by the device.

A yoke 66 is pivotal about coaxial shafts 67 which are carried by the levers. A load carrying unit 68 is connected to yoke 66 at central point 69 of the yoke (Fig. 2). Unit 68 is adapted to be connected to an arrangement of piping or other load (not shown).

A bracket 70 is attached to backing plate 48 (Fig. 1) and carries a roller 71 that bears against and is adapted to ride along portion 23 of Z-shaped member 22. A second roller 72 is secured to backing plate 48 by a bracket (not shown) and is adapted to ride along a generally horizontal plate (also not shown) which is supported between bars 41 of the support unit. The purpose of rollers 71 and 72 is to reduce friction between backing plate 48 and the support unit and to avoid cocking of that backing plate to the extent that it may bindingly engage the support unit.

For the purpose of briefly outlining the operation of the apparatus shown in Figs. 1 and 2, it is assumed that the parts have been assembled and are in the relative position shown in those views. With the parts so arranged, the apparatus is set up to support the normal load for which it is designed, as pins 55 are disposed in the central parts of slots 30. The apparatus is suspended from a supporting structure, such as a beam, by means of connectors 35 and the load is then connected to load-carrying unit 68. The load may consist of a series of pipes that transmit a high temperature fluid. The parts are so constructed and arranged that the apparatus furnishes a substantially constant lifting support for the pipes, while permitting the pipes to move upwardly or downwardly as a result of expansion or contraction due to variations in temperature of the pipes. Downward movement of the load imparts corresponding counterclockwise movement to levers 62 about the common axis of shafts 63. The levers coact with arms 60 to correspondingly move backing plate 48 toward the left, as viewed in Fig. 1.

Figure 3:
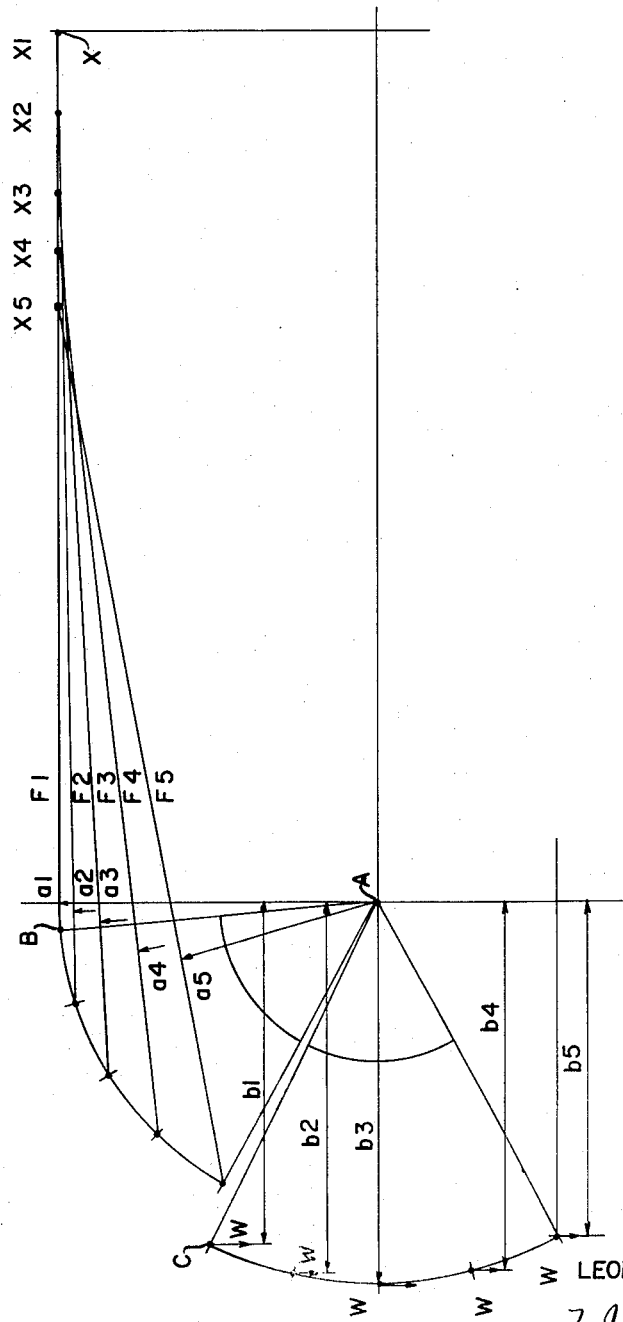
Fig. 3 is a basic force diagram showing the relative position of certain pivotal axes and other data during use of the device illustrated in Figs. 1 and 2.

The balancing effect obtained by the apparatus will be appreciated by persons skilled in the art upon consideration of Fig. 1 and the force diagram shown in Fig. 3. In the diagram, X denotes the pivotal axis of shafts 58, A denotes the pivotal axis of shafts 63, B denotes the pivotal axis of shafts 61 and C denotes the pivotal axis of shafts 67. The weight of the load supported by unit 68 is represented by letter W in the diagram. F1 through F5 denote the spring forces developed in spring 56 at the corresponding indicated different positions of various pivotal axes shown in the diagram. Referring to the diagram and the identifying notations appearing thereon, it will be observed that the load and spring force moments are in balance when the parts of the device are in various relative positions. Thus:

$$W \times b1 = F1 \times a1$$
$$W \times b2 = F2 \times a2$$
$$W \times b3 = F3 \times a3$$
$$W \times b4 = F4 \times a4$$
$$W \times b5 = F5 \times a5$$

Figs. 4 and 5 illustrate a modified form of the invention that is the same in a number of respects to the construction shown in Figs. 1 and 2 wherein all elements of load carrying unit 68 are positioned below and outside the corresponding spring mechanism. The modification includes a spring mechanism 75 having its parts so constructed and arranged as to permit the upper portion of load carrying unit 68 to project into the spring carrying mechanism. This mechanism includes, in addition to support unit 40 and backing plates 48 and 49, a spring means consisting of a pair of coaxial springs 76 and 77 and a floating spring backing unit 78. Unit 78 comprises a pair of parallel plates 79 and 80 that are joined together and maintained in the illustrated spaced-apart relationship by a plurality of spacing bars 81. Plates 79 and 80 are provided with aligned rectangular openings through which rod unit 40 extends. This construction permits movement of backing unit 78 along the rod unit but prevents rotational movement of the backing unit relative to the rod unit. As shown in Fig. 4, springs 76 and 77 are coaxial, spring 76 bearing at its ends against backing plate 49 and plate 79 of the backing unit and spring 77 bearing at its ends against plate 80 of the backing unit and backing plate 48.

Load carrying unit 68 includes an internally threaded female member 84 which is welded or otherwise affixed to yoke 66 (Fig. 5), and an elongated threaded rod 85 which engages female member 84 and which is adapted to be connected at its lower end to a load (not shown). A pair of nuts 86 and 87 serve to lock rod 85 to female member 84. The upper end of rod 85 projects into the space between plates 79 and 80 and also in the space between bars 41 of the rod unit, as best shown in Fig. 5. Thus, in the course of operation, rod 85 is adapted to move within the spring mechanism.

Figs. 6, 7 and 8 illustrate a second modification of the invention wherein the upper portion of the load carrying unit 68 is adapted to project into the spring mechanism. Additionally, other elements are either disposed within or project into the spring mechanism, as will now be described. The construction shown in Figs. 6, 7 and 8 includes a housing 90 comprising a cylindrical tubular frame 91 having cutouts 92 for the reception of a pair of parallel plates 93. Each plate 93 has an arcuate slot 94 corresponding to slots 27 of Fig. 1. Frame 91 is provided with slots 95 corresponding to slots 30. The spring mechanism of this modification is designated by numeral 96 and includes a pair of centrally apertured parallel plates 97 and 98 that are the same as or similar to plates 79 and 80 and that are maintained in the illustrated spaced relationship by arcuate spreaders 99 and 100. The helical compression springs are designated by numerals 101 and 102.

Arms 60, as in the case of the earlier described embodiments, are pivotally connected at their ends to plates 48 and levers 62. These arms are, however, positioned within the spring mechanism instead of being outside of that mechanism. Also, levers 62, as well as the upper end of load carrying unit 68, project into the interior of the spring mechanism 96.

The construction shown in Figs. 6 through 8 is more compact than that shown in the earlier described constructions. As a consequence, the critical dimensions of the device, namely height and width, are correspondingly reduced.

Reference is next had to Figs. 9, 10 and 11 for an understanding of a third modification of the invention. This modification is similar to the construction shown in Figs. 1 and 2 in that it employs a single helical compression spring 56 and is similar to the construction shown in Figs. 6 to 8 in that the arms are positioned within the confines of the spring. The housing 105 is in the form of an imperforate hollow cylinder having end plates 106 and 107. Attached to backing plate 48, preferably by welding, is a pair of elongated U-shaped brackets 108 which carry axially aligned shafts 58. A pair of arms 110, corresponding to arms 60, are pivotally connected at one end to shafts 58 and are pivotally connected at their other ends to shafts 61 of levers 62. The levers are mounted for rotation about shafts 63 which are supported by plates 111 that are affixed to the left end of the housing, as viewed in Fig. 9. It will be appreciated that this modification results in an extremely compact arrangement of parts in which the vertical and transverse dimensions of the device are reduced to a minimum.

The modification of the invention shown in Fig. 12 incorporates a number of the features shown in other views. The construction shown in Fig. 12 permits mounting of the device by suspending it from an overhead support, such as a beam, or placing it on a base so as to support the load from beneath the same.

The spring mechanism shown in Fig. 12 is similar to that illustrated in Figs. 6 to 8. The housing, denoted by numeral 115, is in the nature of an upstanding hollow cylindrical frame having a bracket 116 welded to its upper end. A connecting rod 117 is pivotally coupled to bracket 116, as indicated at 118. The connecting rod is adapted to be attached to a beam or other overhead supporting structure at such times as the device is used in an overhead location. The frame has a bottom flange 119 that is adapted to be affixed to a base by suitable means, such as bolts, screws or the like, when the device is used to support a load from beneath the load.

The device of Fig. 12 includes a pair of levers 120 that are similar to the earlier described levers and a load carrying unit 121, including an eye bolt 122 which is pivotal about the common axis of shafts 67, a threaded connecting rod 123 and a turn buckle 124 which adjustably connects eye bolt 122 to rod 123. Load carrying unit 121 is shown in depending position relative to shafts 67 and directly beneath pivot 118. The parts will be in this relative position when the device is suspended from an overhead supporting structure. When the device is mounted beneath the load, load carrying unit 121 is swung upwardly substantially 180° from the position shown and is connected to the load so that the device may adequately support the load from below.

From the foregoing, it is believed that the objects, construction, operation and advantages of my present invention will be readily comprehended by persons skilled in the art, without further description. Although the invention has been herein shown and described in several simple and practicable forms, it is recognized that certain parts or elements thereof are representative of other parts or elements which may be used in substantially the same manner to accomplish substantially the same results. Therefore, it is to be understood that the invention is not to be limited to the exact details described herein, but is to be accorded the full scope and protection of the following claims.

I claim:

1. In apparatus of the character described, a housing, a lever connected to the housing and movable with respect thereto about a first pivotal axis, a spring mechanism including a stationary support carried by the housing, a pair of spaced backing plates mounted on and movable along the support, and spring means disposed between and bearing against the backing plates, said spring means comprising at least one spring that defines a longitudinal opening through which the support extends, an arm connected to one of the backing plates and movable with respect thereto about a second pivotal axis, said arm being also connected to the lever and movable with respect thereto about a third pivotal axis, and a load-carrying unit connected to the lever and movable with respect thereto about a fourth pivotal axis, said pivotal axes being spaced apart and substantially parallel.

2. In apparatus of the character described, a housing, a lever connected to the housing and movable with respect thereto about a first pivotal axis, a spring mechanism including a stationary support carried by the housing, first and second spaced backing plates mounted on and movable along the support, and spring means disposed between and bearing against the backing plates, said spring means comprising at least one spring that defines a longitudinal opening through which the support extends, means permitting bodily movement of the first backing plate along the support and the housing and preventing rotational movement of the first backing plate relative to the support and the housing, said last-mentioned means comprising a pin carried by the first backing plate and registering with a slot formed in the housing, an arm connected to one of the backing plates and movable with respect thereto about a second pivotal axis, said arm being also connected to the lever and movable with respect thereto about a third pivotal axis, and a load-carrying unit connected to the lever.

3. In apparatus of the character described, a housing, a pair of spaced levers connected to the housing and movable with respect thereto about a common first pivotal axis, a spring mechanism within the housing and including a stationary support carried by the housing, means for varying the effective length of the support, a pair of spaced backing plates mounted on and movable along the support, and spring means disposed between and bearing against the backing plates, said spring means comprising at least one spring that defines a longitudinal opening through which the support extends, a pair of spaced arms connected to one of the backing plates and movable with respect thereto about a common second pivotal axis, said arms being disposed to opposite sides of the support, said levers being also disposed to opposite sides of the support, each arm being connected to and movable with respect to a corresponding lever about a common third pivotal axis, and a load-carrying unit connected to both levers.

4. In apparatus of the character described, a housing, a pair of spaced levers connected to the housing and movable with respect thereto about a common first pivotal axis, means limiting movement of each lever in at least one direction about the first pivotal axis, said means comprising a pin carried by each lever and registering with a slot formed in the housing, a spring mechanism within the housing and including a stationary support carried by the housing, means for varying the effective length of the support, a pair of spaced backing plates mounted on and movable along the support, and spring means disposed between and bearing against the backing plates, said spring means comprising at least one spring that defines a longitudinal opening through which the support extends, a pair of spaced arms connected to one of the backing plates and movable with respect thereto about a common second pivotal axis, said arms being disposed to opposite sides of the support, said levers being also disposed to opposite sides of the support, each arm being connected to and movable with respect to a corresponding lever about a common third pivotal axis, and a load-carrying unit connected to both levers.

5. In apparatus of the character described, a housing, a pair of spaced levers connected to the housing and movable with respect thereto about a common first pivotal axis, a spring mechanism within the housing and including a stationary support carried by the housing, means for varying the effective length of the support, first and second backing plates mounted on and movable along the support, and spring means disposed between and bearing against the backing plates, said spring means comprising at least one spring through which the support extends, means permitting bodily movement of the first backing plate along the support and the housing and preventing rotational movement of the first backing plate relative to the support and the housing, said last-mentioned means comprising a pin carried by the first backing plate and registering with a slot formed in the housing, a pair of spaced arms connected to the second backing plate and movable with respect thereto about a common second pivotal axis, said arms being disposed to opposite sides of the support, said levers being also disposed to opposite sides of the support, each arm being connected to and movable with respect to a corresponding lever about a common third pivotal axis, and a load-carrying unit connected to both levers.

6. In apparatus of the character described, a housing, a pair of spaced levers connected to the housing and movable with respect thereto about a common first pivotal axis, means limiting movement of each lever in at least one direction about the first pivotal axis, said means comprising a pin carried by each lever and registering with a slot formed in the housing, a spring mechanism within the housing and including a stationary support carried by the housing, means for varying the effective length of the support, first and second backing plates mounted on and movable along the support, and spring means disposed between and bearing against the backing plates, said spring means comprising at least one spring through which the support extends, means permitting bodily movement of the first backing plate along the support and the housing and preventing rotational movement of the first backing plate relative to the support and the housing, said last-mentioned means comprising a pin carried by the first backing plate and registering with a slot formed in the housing, a pair of spaced arms connected to the second backing plate and movable with respect thereto about a common second pivotal axis, said arms being disposed to opposite sides of the support, said levers being also disposed to opposite sides of the support, each arm being connected to and movable with respect to a corresponding lever about a common third pivotal axis, and a load-carrying unit connected to both levers.

7. In apparatus of the character described, a housing, a pair of spaced levers connected to the housing and movable with respect thereto about a common first pivotal axis, means limiting movement of each lever in at least one direction about the first pivotal axis, said means comprising a pin carried by each lever and registering with a slot formed in the housing, a spring mechanism within the housing and including a stationary support carried by the housing, means for varying the effective length of the support, first and second backing plates mounted on and movable along the support, and spring means disposed between and bearing against the backing plates, said spring means comprising at least one spring through which the support extends, means permitting bodily movement of the first backing plate along the support and the housing and preventing rotational movement of the first backing plate relative to the support and the housing, said last-mentioned means comprising a pin carried by the first backing plate and registering with a slot formed in the housing, a pair of spaced arms connected to the second backing plate and movable with respect thereto about a common second pivotal axis, said arms being disposed to opposite sides of the support, said levers being also disposed to opposite sides of the support, each arm being connected to and movable with respect to a corresponding lever about a common third pivotal axis, and a load-carrying unit connected to both levers and movable with respect thereto about a common fourth pivotal axis, said pivotal axes being spaced apart and substantially parallel.

8. Apparatus according to claim 5 wherein the levers are disposed to opposite sides of the spring means and the arms are also disposed to opposite sides of the spring means.

9. Apparatus according to claim 5 wherein the levers are disposed to opposite sides of the spring means and the arms are also disposed to opposite sides of the spring means, and wherein the spring means includes a hollow spring backing unit mounted on and movable along the support and a pair of helical compression springs, one of said springs bearing against the first backing plate and the backing unit, the other spring bearing against the second backing plate and the backing unit, said load-carrying unit being adapted to project into the backing unit.

10. Apparatus according to claim 5 wherein the spring means includes a hollow spring backing unit mounted on and movable along the support and a pair of helical compression springs, one of said springs bearing against the first backing plate and the backing unit, the other spring bearing against the second backing plate and the backing unit, and wherein the arms are disposed within the spring means, the levers project into the backing unit, and the load-carrying unit is adapted to project into the backing unit.

11. Apparatus according to claim 5 wherein the arms are disposed in the spring and extend beyond the first backing plate, and wherein the first backing plate is positioned intermediate the levers and the second backing plate.

12. Apparatus according to claim 5 including means at one end of the housing for connecting the housing to a supporting structure in a manner that the line of force exerted by the spring means is substantially vertical.

References Cited in the file of this patent

UNITED STATES PATENTS

| Re. 24,050 | Rouverol | Aug. 9, 1955 |
| 174,574 | Rhodes | Mar. 7, 1876 |
| 2,159,870 | Wert | May 23, 1939 |
| 2,535,305 | Loepsinger | Dec. 26, 1950 |
| 2,656,997 | Holmen | Oct. 27, 1953 |

FOREIGN PATENTS

| 535,823 | Great Britain | Apr. 23, 1941 |